(12) United States Patent
Quinque et al.

(10) Patent No.: US 7,259,341 B2
(45) Date of Patent: Aug. 21, 2007

(54) TAMPER SWITCH ACTUATOR ARRANGEMENT

(75) Inventors: Herve Quinque, Chaville (FR); Ki Sheung Yuen, Brampton (CA); Craig J. Cochran, Atlanta, GA (US)

(73) Assignee: Ingenico Canada Ltd., Toronto, ON (CA)

( * ) Notice: Subject to any disclaimer, the term of this patent is extended or adjusted under 35 U.S.C. 154(b) by 0 days.

(21) Appl. No.: 11/231,832

(22) Filed: Sep. 22, 2005

(65) Prior Publication Data
US 2007/0062791 A1 Mar. 22, 2007

(51) Int. Cl.
*H01H 9/00* (2006.01)
(52) U.S. Cl. .................. 200/511; 200/52 R; 200/334
(58) Field of Classification Search .......... 200/52 R, 200/43.01, 43.16, 43.18, 511–513, 517, 329, 200/334, 341, 345, 292, 298
See application file for complete search history.

(56) References Cited
U.S. PATENT DOCUMENTS

| | | | | |
|---|---|---|---|---|
| 3,748,023 A | * | 7/1973 | Nelson | 40/343 |
| 4,029,914 A | * | 6/1977 | Schmidt et al. | 200/1 R |
| 4,055,735 A | * | 10/1977 | Eachus et al. | 200/5 A |
| 4,083,100 A | * | 4/1978 | Flint et al. | 29/622 |
| 4,085,306 A | * | 4/1978 | Dunlap | 200/275 |
| 5,283,407 A | * | 2/1994 | Pohl | 200/332 |
| 5,386,091 A | * | 1/1995 | Clancy | 200/517 |
| 6,166,662 A | * | 12/2000 | Chuang | 341/22 |
| 6,501,036 B2 | * | 12/2002 | Rochon et al. | 200/302.2 |
| 6,657,147 B2 | * | 12/2003 | Tsutsui et al. | 200/517 |

* cited by examiner

*Primary Examiner*—Michael A. Friedhofer

(57) ABSTRACT

A tamper switch actuator is used in combination with a circuit board held between two outer structural members. The tamper switch actuator includes a suspended displacement member moveable to a conducting position after a given amount of compression of a compressing member. The compressing member cooperates with an outer protecting sleeve and is positioned within and moveable in the axial direction of the sleeve. The tamper switch actuator separates the outer protecting sleeve from the displacement member. With this arrangement the electrical conducting surface of the displacement member can quickly respond to separation of the casing to produce a non-conducting condition or tamper indicating conditions while remaining protected within the outer protecting sleeve.

11 Claims, 4 Drawing Sheets

TAMPER SWITCH ACTUATOR ARRANGEMENT

FIELD OF THE INVENTION

The present invention relates to financial transaction terminals and other devices having a split casing and requiring a security arrangement to respond unauthorized access to the device.

BACKGROUND OF THE INVENTION

A number of different devices are subject to possible tampering and fraudulent activities. Financial transaction terminals, PIN pads and other related monetary devices are particularly vulnerable and a number of different security arrangements have been proposed to reduce the possibility of tampering. Many of these devices are used in non-secure environments such that protection is more difficult.

Some security arrangements include a switch arrangement associated with a printed circuit board. The switch is maintained in a conducting condition by a mechanical securement force maintaining a split case device secured. If a mechanical arrangement securing the casings is released and the split case opened, the switch moves to a non-conducting condition and the terminal appropriately shutdown and assumes an electronically secure condition.

With prior art tamper switch arrangements there is the possibility of compromising the switch to maintain the switch in a conducting position even though the casing has been opened. In some arrangements it is possible to slide a conducting member into an appropriate position on the circuit board to maintain the conducting condition. Guard conductors are sometimes provided on the circuit board to detect such a conductor. Although this assists in protecting the tamper switch arrangement it is not entirely satisfactory.

Most tamper indicating switches include a spring bias that is compressed when the split casing is in an assembled condition. The spring bias assists in maintaining a conducting condition but reduces the sensitivity of the switch when the casing is opened. Therefore, there is trade off between reliability in maintaining the conducting condition and sensitivity to respond to unauthorized access.

The present invention provides a tamper switch arrangement that accommodates expected tolerances between the two case components while also providing a secure tamper switch.

SUMMARY OF THE PRESENT INVENTION

A tamper switch actuator arrangement according to the present invention comprises a resilient compressible member, a displaceable contact member with an electrical conducting surface at one end thereof and a stiff outer sleeve provided about the displaceable contact member. The compressible member in a non-compressed state causes the displaceable member to assume a non-conducting state within the outer sleeve. The displaceable member is movable within the outer sleeve to a conducting position adjacent an end of the sleeve when an axial force is applied to an end of the displaceable contact member opposite the electrical conducting surface.

According to an aspect of the invention in a non-compressed state of the resilient compressible member an end of the displaceable contact member opposite the conducting surface is generally co-planer with a surface of the compressible member opposite the outer sleeve.

In yet a further aspect of the invention the resilient compressible member is integral with the displaceable contact member.

In a further aspect of the invention the displaceable contact member includes a cylindrical body portion moveable axially within the outer sleeve with the cylindrical body portion including a compressible region above the conducting surface.

In yet a further aspect of the invention a displaceable contact member is of a length less than the length of the outer sleeve.

According to an aspect of the invention the cylindrical body portion is closed at one end by the conducting surface.

According to an aspect of the invention the switch actuator arrangement includes a force transfer washer positioned to one side of the compressible member and the displaceable contact member whereby the compressible member is located between the force transfer washer and the outer sleeve.

In a different aspect of the invention the compressible member and the displaceable contact member are integral and are joined by tubular body portion positioned within the sleeve and a thin web spring arrangement joins the tubular body portion and the displaceable member. This results in biasing of the displaceable member towards the non-conducting position until the compressible member is compressed. The displaceable member is generally centered within the tubular body portion and moves to a conducting position after a predetermined compression of said compressible member.

With this arrangement initial compression of the compressible member merely moves the displaceable contact member towards the conducting position. Further compression results in a conducting condition. With this arrangement the displaceable contact member moves to a non-conducting position during initial separation of the casing while the compression member is still under compression. This compression helps maintain the protective sleeve about the displaceable member as it is being biased by the compressible member.

BRIEF DESCRIPTION OF THE DRAWINGS

The above as well as other advantages and features of the present invention will be described in greater detail according to the preferred embodiments of the present invention in which.

Figure 1:
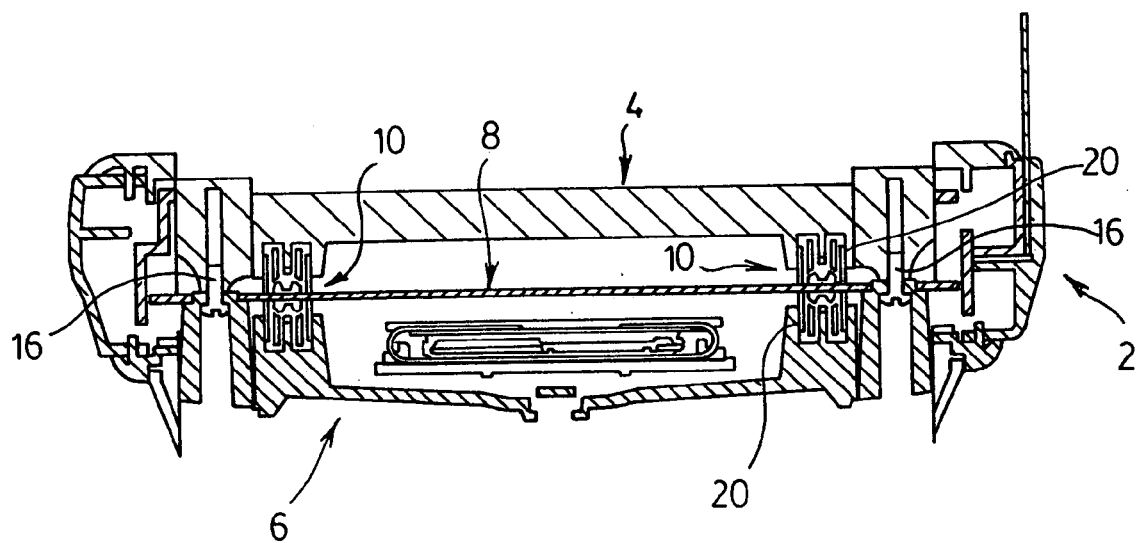
FIG. 1 is sectional view through a financial transaction terminal.
Figure 2:
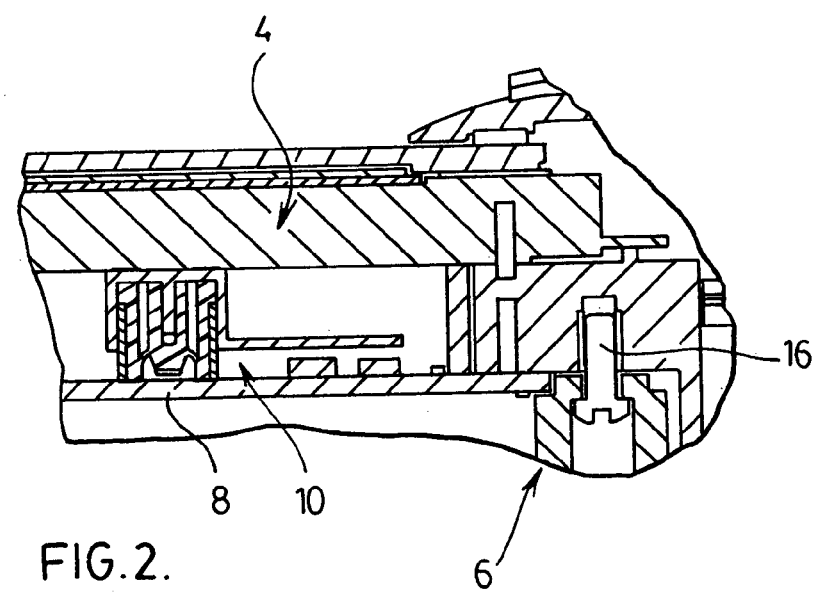
FIG. 2 is a partial sectional view showing the top and bottom casings of the terminal mechanically secured to one another with the tamper switch arrangement engaging the circuit board.

DETAILED DESCRIPTION ACCORDING TO THE PREFERRED EMBODIMENTS OF THE PRESENT INVENTION IN WHICH:

The financial transaction terminal 2 as shown in FIG. 1 has a split casing defined by a top casing 4 mechanically secured to a bottom casing 6. A circuit board 8 is provided interior to the terminal and is protected by means of the tamper switch 10. The top and bottom casings are held together by one or more mechanical connections 16. Preferably a tamper switch 10 is provided on each side of the circuit board 8 in opposed relationship. This double switch arrangement assumes a non-conducting position if either of the switches is activated. The terminal assumes a security breech has occurred and automatically initiates an appropriate electronic action with a change in either switch. In many cases, this electronic action is a secure shutdown of the device.

As shown in FIG. 1, the tamper switch 10 is preferably provided in close proximity to one of the mechanical connections. Basically, the tamper switch 10 is held in a compressed state by means of the mechanical connection securing the top and bottom casings and separation of the two casings causes the switch 10 to assume a non-conducting position with the circuit board 10. Once this occurs the device can only be reactivated in a predetermined secure manner. Often the device must be returned to an authorized repair facility.

The tamper switch 10 as shown in FIG. 1 is partially located within a guard pocket 20 of the casing. This guard pocket receives the various components of the tamper switch arrangement including part of the outer sleeve 34, the compressible ring 30, the displaceable actuator 32 and the force transfer washer 36. The outer protecting sleeve 34 acts as a guard wall protecting the displaceable actuator essentially confined within the outer protecting sleeve. Preferably, the outer protecting sleeve is a stainless steel ring or other suitable high strength material that is difficult to damage. It can also be appreciated that the ring extends essentially to the surface of the circuit 8 with a thin insulating flange 62 of resilient material provided between the bottom of the protecting sleeve and circuit board 8.

Preferably, the compressible ring 30 and the displaceable actuator 32 are of an integral construction joined by means of the connecting body 60. The thin flange 62 is provided at the bottom of connecting body 60. The connecting is of a tubular shape. The connecting body 60 includes an annular bridging segment 64 that serves to locate and provide a partial spring bias for the displaceable actuator 32. The displaceable actuator 32 extends essentially from the compression ring end of the molded component to a non-compressed position a predetermined distance short of the opposite ends of the molded component. The displaceable actuator 32 includes a carbon conducting surface 38 at one end thereof for electrical engagement with the circuit board 8. In the non-compressed state the conducting surface is spaced a certain distance from the circuit board.

Figure 3:
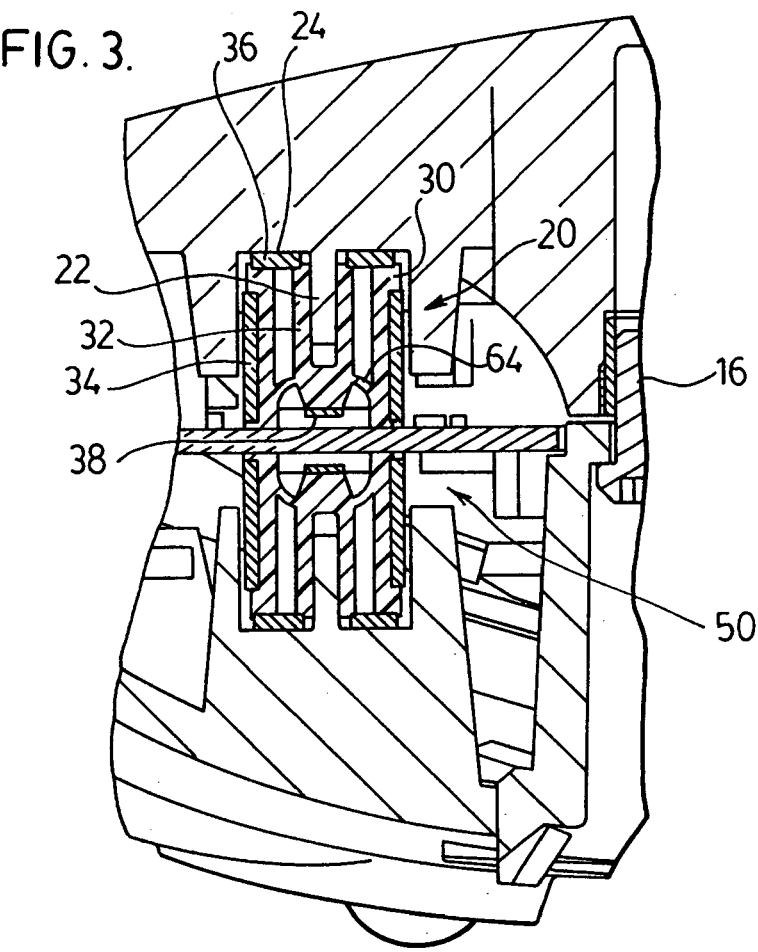
FIG. 3 is a partial sectional view showing further details of the tamper switch actuator arrangement with one such arrangement provided at either side of the circuit board.

As shown in FIG. 3, in addition to the guard pocket 20, the casing includes an aligning pin 22 which is received within the open cylinder portion 33 of the displaceable actuator 32. This assists in locating the conducting surface 38 on the circuit board 8 secured in the casings. The aligning pin 22 also compresses the resilient material 39 of the displaceable actuator 32 located between the end of pin 22 and conducting surface 38.

Figure 4:
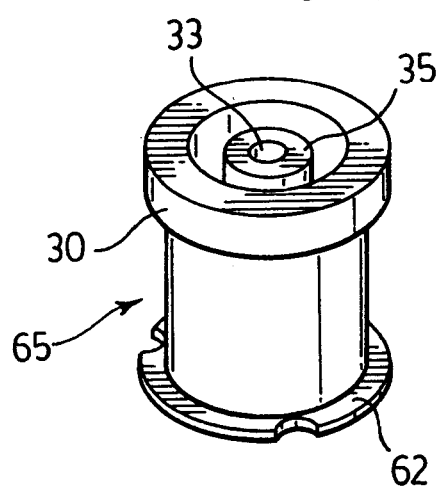
FIG. 4 is a perspective view of actuating portion of the tamper switch actuator.
Figure 5:
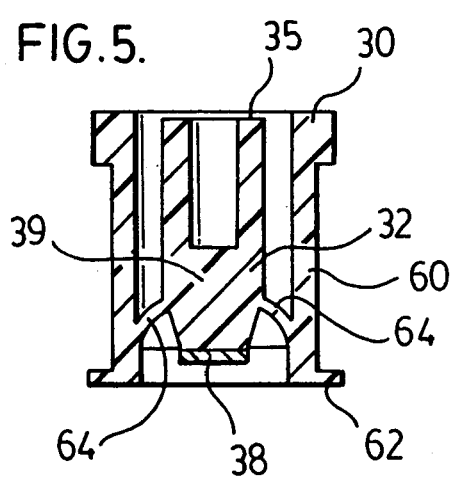
FIG. 5 is a sectional view through a member of FIG. 4.
Figure 6:
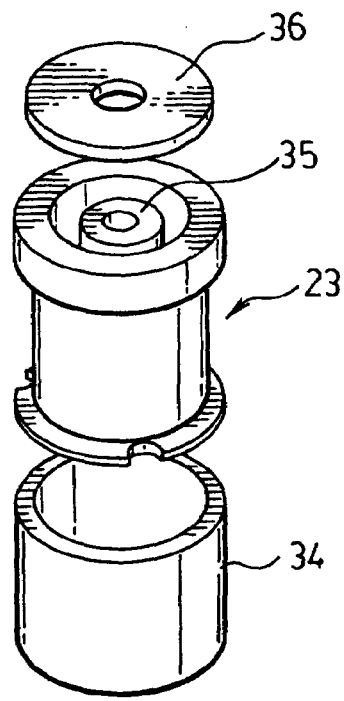
FIG. 6 is an exploded perspective view showing the actuating mechanism, the outer sleeve and the top force transfer member.
Figure 7:
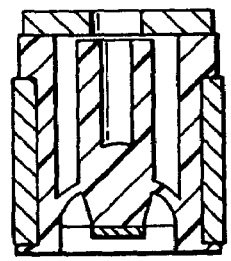
FIG. 7 is a view similar to FIG. 6 with the various components in an assembled relationship.

The displaceable actuator 32 as illustrated in FIGS. 4 and 5 is positioned within the connecting body 60 and is displaceable within the body by means of flexing of the bridge segment 64. The bridge segment provides a spring bias urging the displaceable member 32 to the position shown in FIG. 5. Unloading of the compression of the compressible ring 30 and resilient material 39 associated with aligning pin 22 produces axial expansion thereof and a corresponding movement of the displaceable actuator 32. The resilient component 65 is molded of a resilient material and serves several functions. This member includes the compression ring 30 that accommodates tolerances and also provides a bias force on the protecting sleeve 34. The component also provides and retains the displaceable member in a protected central location. It also provides the compression region 39 of the displaceable actuator. The component 65 also serves to capture and retain the sleeve and provide an insulating layer therebelow. It also provides a friction engagement with the guard pocket by deformation of ring 30 and friction engagement between recess 35 and the alignment pin 22.

Figure 8:
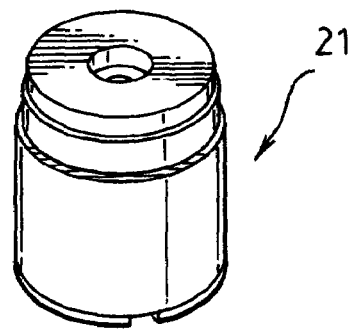
FIG. 8 is a perspective view of the assembled components.

Assembly of the tamper switch actuator arrangement 21 is generally shown in FIG. 8. The molded member 23 is inserted into the outer protecting sleeve 34 and the force transfer washer 36 is located over both the compressible ring 30 and the end 35 of the displaceable actuator 32. The thin flange 62 is positioned below the bottom edge of the outer protecting sleeve 34. Basically, the compressible ring 30 provides the spring bias resistance to the final positioning of the outer casings, and this member is of a resilient compressible material such as silicon elastomeric TPE. This resilient compression makes it very difficult to gain access to the displaceable actuator. Pin 22 pushes the conducting surface 38 into contact with the circuit board. The compression of the outer surface, the stiff outer sleeve, and the thin flange protects the conducting surface 38 from mechanical intrusion.

The compressible ring 30 acts upon the protecting sleeve 34 and assures contact of the thin flange 62 with the circuit board. Various guard rings of the circuit board can be provided exterior to the outer sleeve. With this arrangement it is difficult to gain unauthorized access to the displaceable actuator 32 to hold it in a conducting position. As soon as the casings start to separate the compressible ring 30 expands and the pin 22 moves away from the circuit board allowing displaceable actuator 32 to move away from the circuit board as the compression force is reduced.

This arrangement, with the displaceable actuator 32 suspended within the connecting body 60 or relative to the compression ring 30, is particularly effective when used in an opposed relationship as shown in FIG. 3. Preferably, the various connections to the switch contacts on the circuit board can be interior to the board.

Figure 9:
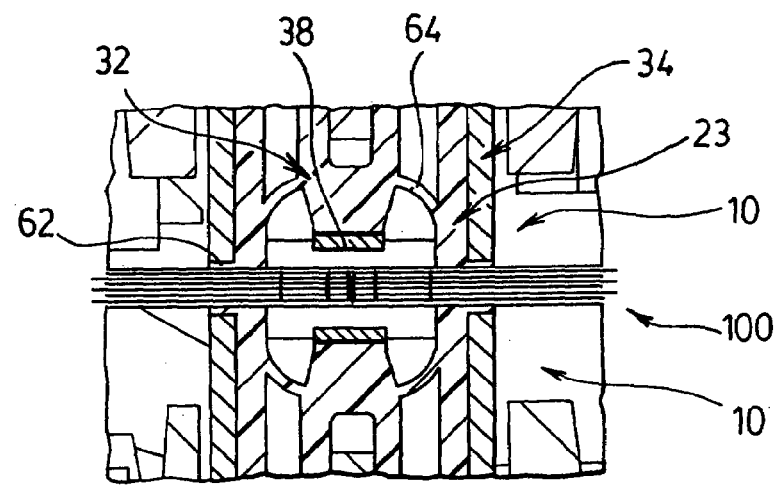
FIG. 9 is a partial sectional view showing two opposed tamper switches.

FIG. 9 shows two tamper switches 10 on opposite sides of a circuit board 100. The circuit board 100 includes a plurality of via holes shown as 120, 122, 124, 126, 128 and 130 in the simplified illustrative view of FIG. 10. The via holes are all located within and protected by the two tamper switches 10. As previously described the tamper switches 10 include the outer protecting sleeve 34 which is exterior to the various via holes. Thus, the opposed tamper switches form a barrier that surrounds the various via holes 120 through 130.

Figure 10:
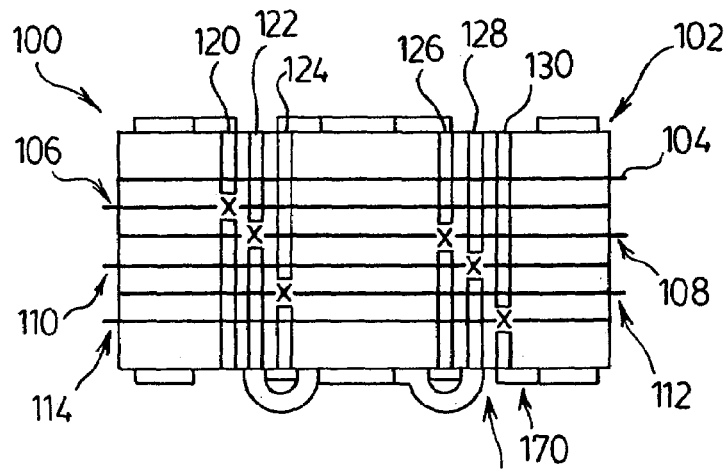
FIG. 10 is an illustrative view of the circuit board with a series of via holes.

As shown in the sectional view of FIG. 10, the circuit board 100 has a top layer identified as 102, a general signal layer 104, a ground playing layer 106, a secure layer 1 108, a secure layer 2 110, a secure mesh layer 112, a power plain 114 and a bottom layer 116.

Figure 11:
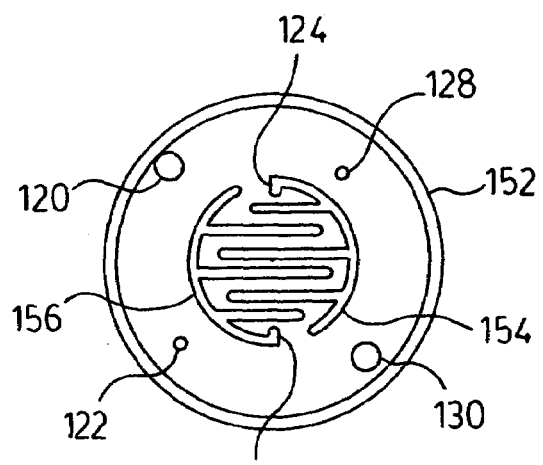
FIG. 11 is a top view of a security trace.

The particular construction of the circuit board can vary considerably depending upon the particular purpose. In the present case, as shown in FIG. 11, the top surface includes a guard ring 152 connected to the via hole 120. As shown in FIG. 10, the via hole 120 is connected to the ground plain 106. The top surface also includes trace element 154 connected to the via hole 124 which is shown in FIG. 10 as connected to the secure mesh layer 112.

Figure 12:
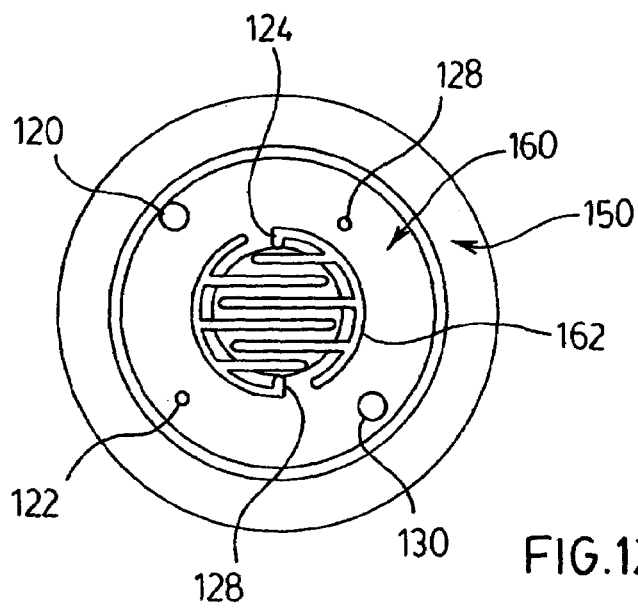
FIG. 12 is a view of the security trace in relation to a displaceable contact member.

FIG. 12 shows an outer order layer 150 which would generally correspond with the outer protective sleeve 34. Thus it can be seen that the via holes 120 through 130 are all located interior to this outer protecting ring. In this way, unauthorized access to the various via holes is denied.

From FIG. 10 it can be appreciated that via hole 122 serves to connect the secure mesh layer 112 with one of the inner trace patterns and via hole 128 serves to connect the other bottom trace element to the secure layer 2. These inner trace elements are connected by the bottom actuator provided on the underside of the circuit board 100. In this case, the outer guard ring shown as 170 is connected to the via hole 130 and forms an electrical connection with the power plain 114.

From a review of FIGS. 9 through 12, and the earlier Figures, it can be appreciated that the use of this particular tamper switch in opposed relationship with a further tamper switch, and providing a series of via holes through the circuit board allows simplified electrical connection and protects the device from possible tampering as the various via holes are all located interior to the outer protective sleeves 34 of the tamper switches. Thus the circuit board can be manufactured in a simplified manner and the use of open via holes is possible due to the cooperation with the tamper switches.

It can also be appreciated from a consideration of the schematics that the guard rings on the top and bottom layers have been effectively reversed and provide a further deterrent to unauthorized access.

It has been found that this arrangement allows a certain amount of compression of the ring to accommodate tolerance variations of the casing and the pockets of the casing. It is important that the tamper switch arrangement responds quickly to separation of the casing but it is also important that this switch is acceptable for plastic molded components that are subject to acceptable tolerance variations. It has been found that this particular arrangement works effectively. The casings are preferably an injection molded polycarbonate or other relative stiff high strength plastic.

As shown in the drawings, the compressible ring 30 is in the guard pocket and located between the end of the protecting sleeve 34 and the force transfer washer 36. The displaceable actuator 32 receives the aligning pin 22 that additionally functions to compress actuator 32. The actuator 32 includes the bridge segment 64 which forms a cup about the actuator 32. This protects the electrical conducting surface from an infusion of silver ink in an attempt to defeat the switch.

The washer and the sleeve with the compression layer within the guard pocket allows for tolerance variations that occur, particularly with the casings.

A further advantage of the switch is with respect to its ability to remain assembled. The outer protective sleeve remains captured on the compressible ring 30. The ring 30 can engage the sides of the guard pocket and the alignment pin 22 can frictionally engage and be retained within the recessed end of the displaceable actuator. The actuator is able to act generally independent of the outer sleeve. The arrangement makes assembly of tamper switch arrangements on opposite sides of a PCB board convenient. It also avoids the need for adjustment of the position of the switches.

Although various preferred embodiments of the present invention have been described in detail, it will be appreciated by those skilled in the art that variations may be made without departing from the spirit of the invention or the scope of the appended claims.

The invention claimed is:

1. A tamper switch actuator arrangement comprising a resilient compressible member, a displaceable contact member with an electrical conducting surface at one end thereof, a stiff outer sleeve provided about said displaceable contact member, said compressible member in a non-compressed state causing said displaceable contact member to assume a non-conducting state within said outer sleeve; said displaceable contact member being movable to a conducting position adjacent an end of said sleeve when an axial force is applied to an end of said displaceable contact member opposite said electrical conducting surface; and wherein an end of said displaceable contact member opposite said conducting surface in a non-compressed state of said resilient compressible member is generally coplanar with a surface of said compressible member opposite said outer sleeve.

2. A tamper switch actuator arrangement as claimed in claim 1 wherein said resilient compressible member is integral with said displaceable contact member.

3. A tamper switch actuator arrangement as claimed in claim 2 wherein said displaceable contact member includes a cylindrical body portion moveable axially within said outer sleeve.

4. A tamper switch actuator arrangement as claimed in claim 3 wherein said displaceable contact member is of a length less than the length of said sleeve.

5. A tamper switch actuator arrangement as claimed in claim 3 wherein said cylindrical body portion is closed at one end by said conducting surface.

6. A tamper switch actuator arrangement as claimed in claim 1 including a force transfer washer positioned to one side of said compressible member and said displaceable contact member whereby said compressible member is located between said force washer and said sleeve.

7. A tamper switch actuator arrangement as claimed in claim 6 wherein said compressible member and said displaceable contact member are integral and are joined by a tubular body portion positioned within said sleeve and a thin web spring arrangement joining said tubular body portion and said displaceable member and biasing said displaceable member towards said non-conducting position, said displaceable member being generally centered within said tubular body portion.

8. A tamper switch actuator arrangement as claimed in claim 1 wherein said displaceable contact member includes a compressible region above said electrical conducting surface that when compressed provides a bias force for said electrical conducting surface.

9. A tamper switch actuator arrangement as claimed in claim 8 wherein said displaceable contact member includes a recess for receiving a pin actuator at an end thereof opposite said electrical conducting surface.

10. In combination a circuit board and opposed tamper switch elements, said circuit board having opposed security trace elements on opposite sides thereof and a plurality of via holes selectively connecting said trace elements to electrical circuits of said circuit board; each of said switch elements including a displaceable conducting member electrically connecting said trace elements in contact therewith, and wherein said switch elements collectively cover said via holes; each of said switch elements including an outer protecting sleeve that provides a peripheral barrier about said trace elements and said via holes; and wherein said circuit board has at least 4 layers.

11. In combination as claimed in claim 10 wherein said circuit board includes at least 4 via holes and each of said switch elements is independent of the other switch elements and each of said switch elements is electrically conductive one of said trace elements.

* * * * *